United States Patent
Frederiksen

(12) 
(10) Patent No.: US 6,570,596 B2
(45) Date of Patent: *May 27, 2003

(54) CONTEXT SENSITIVE POP-UP WINDOW FOR A PORTABLE PHONE

(75) Inventor: Steen Lillethorup Frederiksen, Allerød (DK)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,484

(22) Filed: Mar. 24, 1999

(65) Prior Publication Data
US 2002/0080186 A1 Jun. 27, 2002

(30) Foreign Application Priority Data
Mar. 25, 1998 (GB) .............................................. 9806325

(51) Int. Cl.$^7$ ................................................. G06F 3/00
(52) U.S. Cl. ........................ 345/808; 345/810; 345/841; 345/975; 345/857; 345/157
(58) Field of Search ................................. 345/326, 338, 345/340, 347, 352, 353, 333, 341, 123, 156, 975, 157, 160, 167, 184, 708, 781, 808, 810, 841, 744, 784, 857; 455/575, 560, 550

(56) References Cited

U.S. PATENT DOCUMENTS

| | | | | |
|---|---|---|---|---|
| 5,633,912 A | * | 5/1997 | Tsoi | 455/566 |
| 5,692,032 A | | 11/1997 | Seppanen et al. | 379/59 |
| 5,778,404 A | * | 7/1998 | Capps et al. | 707/531 |
| 5,794,142 A | | 8/1998 | Vanttila et al. | 455/419 |
| 5,825,353 A | * | 10/1998 | Will | 345/184 |
| 5,841,849 A | * | 11/1998 | Macor | 379/142.17 |
| 5,841,855 A | * | 11/1998 | Davidson et al. | 379/396 |
| 5,845,205 A | | 12/1998 | Alanara et al. | 455/564 |
| 5,870,683 A | * | 2/1999 | Wells et al. | 455/566 |
| 5,878,351 A | | 3/1999 | Alanara et al. | 455/466 |

(List continued on next page.)

FOREIGN PATENT DOCUMENTS

| | | |
|---|---|---|
| DE | 19717719 | 4/1999 |
| EP | 0 651 544 A2 | 5/1995 |
| EP | 0 715 441 A1 | 6/1996 |
| EP | 0 872 993 A2 | 10/1998 |
| EP | 0 872 993 A3 | 6/1999 |
| GB | 2 319 691 A | 5/1998 |
| GB | 2 322 513 A | 8/1998 |
| GB | 2 329 070 A | 3/1999 |
| GB | 2 329 083 A | 3/1999 |
| GB | 2 329 094 A | 3/1999 |
| GB | 2 333 386 A | 7/1999 |
| WO | WO 97/50264 | 12/1997 |

*Primary Examiner*—John Cabeca
*Assistant Examiner*—Kieu D. Vu
(74) *Attorney, Agent, or Firm*—Perman & Green, LLP

(57) ABSTRACT

A portable phone is described having a display, input device for inputting information and instructions, and a control unit controlling the display in dependence on the operation of the input device. The input device includes a navigation device for moving a marker in an active part of the display. The navigation device is provided with a roller body and includes the ability for detecting the rolling and depression of the roller body and for providing control signals in response thereto. In an information input mode, the control unit moves the marker in the display in dependence on the rolling control signal and generates a pop-up window upon reception of the depression control signal, the pop-up window covering a part of the active display and containing operations which are allowed in a position defined by the marker.

22 Claims, 6 Drawing Sheets

U.S. PATENT DOCUMENTS

| | | | | |
|---|---|---|---|---|
| 5,930,700 A | * | 7/1999 | Pepper et al. | 455/414 |
| 6,026,233 A | * | 2/2000 | Shulman et al. | 717/113 |
| 6,052,070 A | * | 4/2000 | Kivela et al. | 341/22 |
| 6,055,439 A | * | 4/2000 | Helin et al. | 455/550 |
| 6,097,964 A | * | 8/2000 | Nuovo et al. | 455/550 |
| 6,102,967 A | | 8/2000 | Feigner et al. | 717/1 |
| 6,141,011 A | | 10/2000 | Bodnar et al. | 345/357 |
| 6,160,554 A | * | 12/2000 | Krause | 345/348 |
| 6,195,569 B1 | | 2/2001 | Frederiksen | 455/566 |
| 6,201,534 B1 | * | 3/2001 | Steele et al. | 345/157 |
| 6,363,259 B1 | | 3/2002 | Larsen | 455/550 |

* cited by examiner

CONTEXT SENSITIVE POP-UP WINDOW FOR A PORTABLE PHONE

BACKGROUND OF THE INVENTION

The invention relates to a new and improved user interface (UI) for a telephone handset. The UI of hand portable phones for cellular or cordless systems does not just support the call handling alone. In the recent generations of hand portable phones more and more new applications have been integrated in the phones.

Navigation among the menu items, handling of the individual applications and editing of text as input for the applications are very difficult to perform, because the most commonly used type of navigation is carried out by an up/down scroll key. The number of operations that may be performed by a hand portable phone continues to increase. However, in order to make the phone more user-friendly it is desired to simplify the keypad, since many non-technical users take fright at keys if they do not know how to handle these keys. In general, customers are frightened when they see a keypad overwhelmed with special keys.

In order to reduce the number of keys on a handset more and more functions and operations are integrated in a reduced number of keys. A phone named Nokia 3110® marketed by the applicant has a very limited number of keys having the most commonly used functions and operations as default options, while the functions and operations not used so often are alternative options. This concept is described in a UK patent application 9624520.4 and was fully accepted by the user group when introduced.

Even though this concept makes it much easier for new phone users to become familiar with the most commonly used operations, such as making calls, handling the electronic phone book, etc., it does not improve the usability of the more rarely used operations, such as making conference calls, message handling, etc.

UK patent application 9703646.1 describes a concept according to which a window pops up when a soft key is depressed. This window contains a list including operations available through the soft key.

SUMMARY OF THE INVENTION

In accordance with the invention there is provided a portable phone having a display, input means for inputting information and instructions to a control unit in the phone, said control unit controlling the display in dependence on the operation of the input means; said input means including means for moving a marker in the display; and means for providing a request to the control unit for displaying operations which are allowed in a position defined by said marker; said control unit generating a pop-up window which covers a part of the display upon reception of the request, and which includes said allowed operations. Hereby both the options normally present in the soft keys and the navigation of the cursor may be integrated in the roller body of the navigation means.

One important advantage is that the active part of the display may be increased, because one out of three to five text lines of the display does no longer have to be dedicated to the displaying of the soft key functionality. Another advantage is that a number of the keys may simply be left out. In a simple way, it is hereby easy to obtain a navigation and selection key with the desired properties.

An embodiment of the invention provides a new and improved user interface for a telephone hand set, wherein the default and alternative options available are displayed in a way giving the user a better view of the available options.

Advantageously, the means for moving a marker in the display comprises a navigation key means having a roller body whose rolling is detected by means of an encoder operatively connected to the control unit which controls the movement of the marker in the display in dependence thereon. Preferably, the request means comprises a sensor integrated in a support structure for the roller body, said moving and request means being integrated in the navigation key means. The contents of the pop-up window in an entry or editing mode show marker determined context sensitivity. At present, the LCD displays are the preferred type of displays used for e.g. phones, and this type of display is a dot matrix display in which the display signs are preferably arranged in a predetermined number of lines in the active part of the display, each of said lines may contain a plurality of signs, and said marker is provided as a gleaming bar which may be positioned between two of said signs. A new sign is entered to the right of the gleaming bar, and the gleaming bar is moved to the right of the newly entered sign.

Advantageously, the phone changes state upon the occurrence of the context sensitive pop-up window to a listing mode in which a plurality of allowable operations are listed in the pop-up window, and wherein said request providing input means changes functionality to a selection means which, when depressed, selects the operation marked by the cursor. Hereby the same key may be used for different types of navigation in dependence on the present mode of the phone.

By providing the phone with an editor not depending on an alphanumeric keypad, but controlled by the control unit and operated by the navigation key means, the alphanumeric keypad may simply be left out. Hereby it is possible to have the roller body based navigation key as the sole input key. A power on/off key may be present on the phone. The control unit defines for the editor a first display part in the display for displaying a string of entered information; a second display part in the display for displaying a string of a plurality of possible information candidates; one of the candidates in the candidate string being highlighted by the cursor whose movement through information candidates is controlled by the rolling of the navigation key means, and said highlighted candidate being selectable for entering into the string of entered information by pressing the navigation key means.

The invention therefore also relates to a portable phone having a display, input means for inputting information and instructions to a control unit in the phone, said control unit controlling the display in dependence on the operation of the input means; said input means including a depressable roller body; a support structure for the roller body; an encoder operatively connected to the control unit for detecting the rolling of the roller body; and a sensor operatively connected to the control unit for detecting the depression of the roller body; said control unit generating a pop-up window which includes a set of allowed operations and which covers a part of the display upon reception of a request provided by depressing the roller body. According to a preferred embodiment of the invention, the navigation key is the only input means of the phone.

The pop-up window is demarcated from the active display area by means of borderlines defining a rectangular frame. When the text is black on a light (yellow or green) background, the rectangular frame may advantageously be black like the text and have a line width corresponding to 2–3 pixels or dots. When the pop-up window area covers from 30 percent to 70 percent of the full active display area, the user will always have the possibility of seeing a part of the background display which is sufficient to recognize the mode or display.

According to the preferred embodiment, the pop-up window contains two-four selectable operations within the rectangular frame. However, the control unit handles a list including a plurality of selectable operations arranged in a predetermined order with only a fractional set of the full set of operation shown simultaneously in the pop-up window. Rolling of the navigation key means causes scanning through the full set of operations. The window thereby moves along the full list.

Preferably, the full list is not provided as an endless loop. Preferably, the full set of operations is arranged with two operations defined as a first item and a last item in the list, respectively; and in the listing mode, when the cursor passes outside the first or the last item in the list, the pop-up window disappears and the phone goes from listing mode to the mode associated with the background display.

Preferably, the context sensitive pop-up window includes all available operations. These are available from a number of sub-menus according to the state of the art. Now the user does no longer have to remember the path to the sub-menu he can just select from a list.

DETAILED DESCRIPTION OF THE INVENTION

Figure 1:
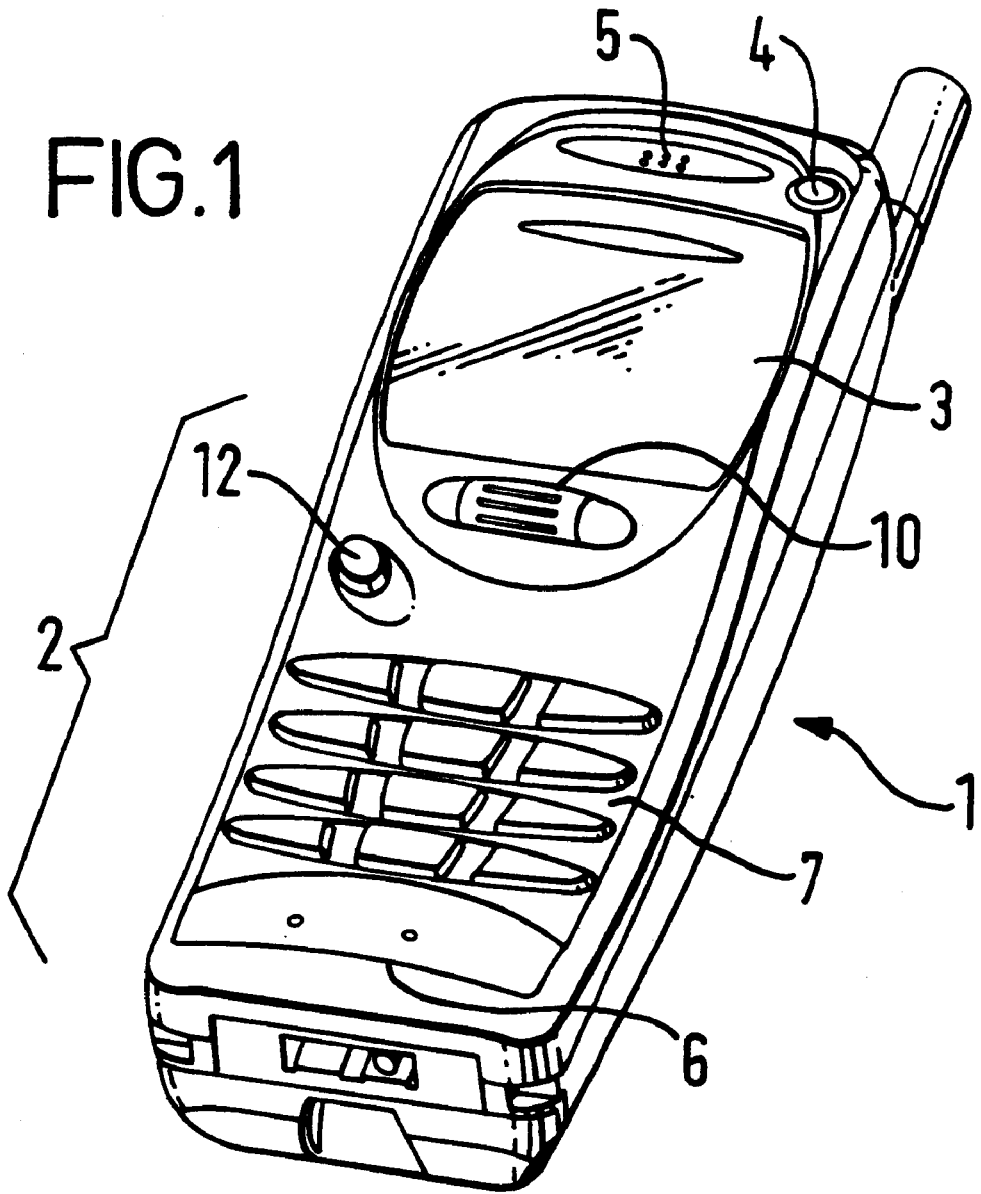
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, an ear-piece 5, and a microphone 6. The phone 1 according to the preferred embodiment is adapted for communication via a cellular network, but could have been designed for e.g. a cordless network as well. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0–9" or a sign "#" and "*", respectively. In alpha mode each key is associated with a number of letters and special signs used in the text editing.

The keypad 2 additionally comprises a navigation and selection key 10 and a clear key 12. The clear key 12 may be used e.g. for erasing the digit or letter entered last by brief depression, while depression of a longer duration will erase the entire number or word.

The phone may comprise two call handling keys like in Nokia 8110™, but according to the preferred embodiment the call handling is included in the navigation and selection key 10. This means that depressing the navigation and selection key 10 once in idle mode with at least one digit in the display will cause a pop-up window having "call establishment" as one item to appear, and when the call has been established by selecting "call establishment" by pressing the navigation and selection key 10, the items in the pop-up window will change to "call termination", "conference call", etc.

The navigation and selection key 10 is placed centrally on the front surface of the phone between the display 3 and the group of alphanumeric keys 7. Hereby the user will be able to control this key with his thumb. This is the best site to place an input key requiring precise motoric movements. Many experienced phone users are used to one-hand handling. They place the phone in the hand between the finger tips and the palm of the hand. Hereby the thumb is free for inputting information.

Figure 3:
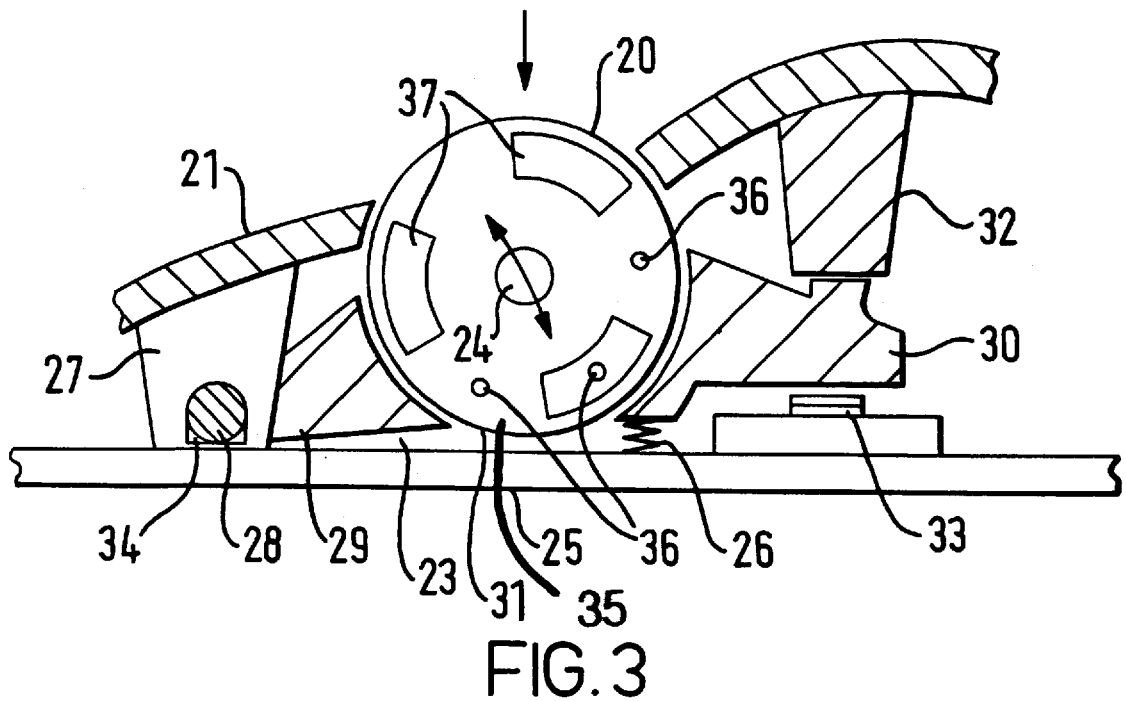
FIG. 3 schematically and in cross-section shows the part of the phone shown in FIG. 1 included in the navigation and selection key according to the invention.

As will be seen from FIG. 3, the navigation and selection key 10 includes a roller body 20 which extends partly through an opening in the front cover 21 of the phone, and said roller body 20 is essentially cylindrical with a length and diameter of the same size as the width of the keys in the alphanumeric group of keys 7. When the axis of rotation of the roller body 20 is provided such that it extends perpendicularly to the longitudinal axis of the phone 1, the rolling of the roller body 20 will move a cursor in the display in an up/down direction corresponding to the movement of the thumb. For fulfilling this purpose the navigation and selection key is provided with encoder means (not shown) converting the rotation of the roller body into a train of electronic pulses fed to a processor 17 of the phone. The navigation and selection key structure is furthermore provided with a microswitch (not shown) for detecting the depression of the roller body 20, thereby providing a selection signal for the processor 17 indicating that the item pointed out in the display has been selected. The navigation and selection key is described in detail in GB patent applications 9727062.3, 9727058.1 and 9727060.7 filed by the applicant on Dec. 22, 1997. These pending applications are hereby incorporated by reference.

When the navigation and selection key 10 is arranged as an extension of the central column of the alphanumeric keys 7, the navigation and selection key 10 can be accessed optimally by both left- and right-handed users.

Figure 2:
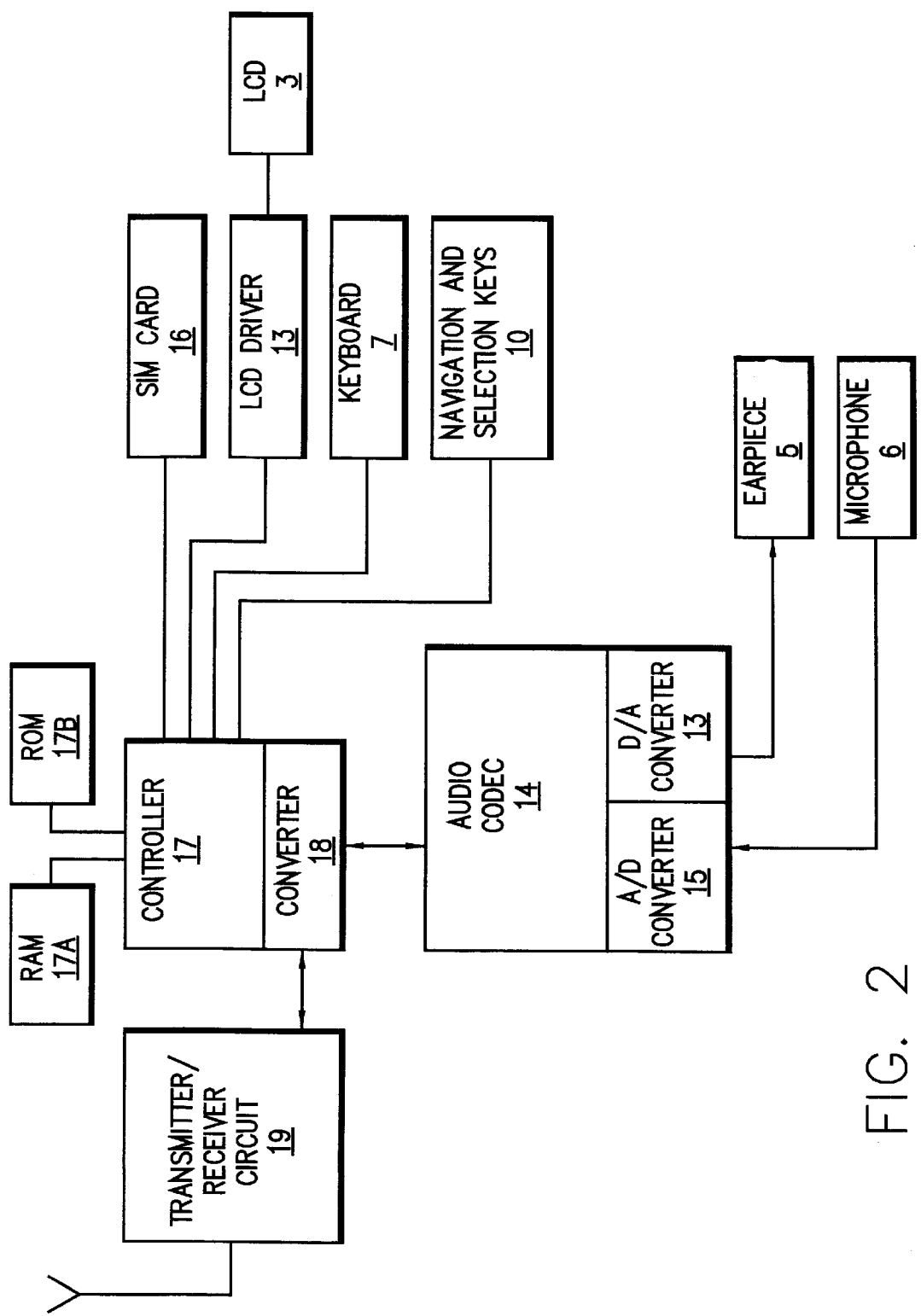
FIG. 2 schematically shows the essential parts of a telephone for communication with a cellular or cordless network.

FIG. 2 schematically shows the most important parts of a preferred embodiment of a portable phone, said parts being essential to the understanding of the invention. The preferred embodiment of the phone of the invention is adapted for use in connection with the GSM network, but, of course, the invention may also be applied in connection with other phone networks, such as cellular networks and various forms of cordless phone systems. The microphone 6 records the user's speech, and the analog signals formed thereby are A/D converted in an AND converter 15 before the speech is encoded in an audio codec unit 14. The encoded speech signal is transferred to a physical layer processor 17, which i.a. supports the GSM terminal software. The processor 17 also forms the interface to the peripheral units of the apparatus, including the memories (RAM, ROM), the display 3 and the keypad 2 (as well as SIM, data, power supply, etc.). The processor 17 communicates with the RF part 19 via a baseband converter 18 and a channel equalizer 16. The audio codec unit 14 speech-decodes the signal, which is transferred from the processor 17 to the ear-piece 5 via a D/A converter 13. The units 13–18 are usually integrated in a chip set—either a commercially available one or in a set of specially designed chips (ASIC's).

The processor 17, which serves as the controller unit in a manner known per se in the preferred embodiment, is connected to the user interface. Thus, it is the processor which monitors the activity in the phone and controls the display 3 in response thereto.

Therefore, it is the processor 17 which detects the occurrence of a state change event and changes the state of the phone and thus the display text. A state change event may be caused by the user when he activates the keypad including the navigation and selection key 10, and this type of events is called entry events or user events. The processor 17 is able to detect the rolling and depression of the roller body 20 by means of a microswitch and an encoder, as will be explained briefly with reference to FIG. 3. However, also the network in communication with the phone may cause a state change event. This type of events and other events beyond the user's control are called non user events. Non user events comprise status change during call set-up, change in battery voltage, change in antenna conditions, message on reception of SMS, etc.

FIG. 3 illustrates how the navigation and selection key structure according to the invention is placed in a hand portable phone. The navigation and selection key structure comprises a roller body 20 acting as a navigation and selection key and a carrier 23 for carrying the roller body 20. The carrier 23 comprises a beam 29 carrying the stub shaft 28 as hinge parts, a beam 30 and a shaft 24 carrying the roller body 20. The two beams 29, 30 and the shaft 24 are parallel and are interconnected by bearings 31, 35 at each end.

A part of the roller body 20 extends through a close fitting opening (no contact) of the front cover 21 of the phone. The rear side of the front cover 21 is provided with two gripping arms 27 having U-shaped recesses 34 for receiving stub shafts 28, thereby, as a supporting means, defining a hinge axis for the carrier 23. The gripping arms 27 act as spacer members between the front cover 21 of the phone and the printed circuit board (PCB) 25. The latter constitutes a locking member for the shaft bearing provided by the recesses 34 of the gripping arms 27. The distance between the gripping arms 27 is slightly smaller than the length of a shaft body 24 to avoid axial displacement of the carrier 23.

A spring 26 is provided as a biasing means for urging the carrier 23 away from the printed circuit board 25 towards the front cover 21 of the phone. The front cover 21 is provided with two stop legs 32 which cooperate with an upper surface of the part 30 of the carrier facing away from the hinge 28, 34. The lower surface of the carrier part 30 is adapted for cooperation with a microswitch 33. The distance between the contact faces on the microswitch 33 and the stop legs 32 is slightly greater than the thickness of the corresponding carrier part. The coil 26 urges the carrier 23 towards the stop legs 32. When the user depresses the roller with a force greater than the coil force, the carrier will be urged against the microswitch 33 giving an output signal in dependence thereon. The microswitch 33 acts as a detection means for detecting the force counteracting the biasing force provided by the coil 26.

When the roller body 20 is depressed, the whole navigation and selection key structure performs a swing movement around the hinge axis defined by the gripping means 28, 34.

The end wall of the roller body 20 is provided with a number of conducting areas 37. As indicated in FIG. 3, a number (three according to the preferred embodiment) of sliding shoes 36 (contact springs) of the metallic strips slide along a circular path passing the conductive areas. The sliding shoes 36 and the conducting areas 37 are the interacting part of the encoder by means of which the control unit 17 detects the rolling of the roller body 20. The sliding shoes are mounted on a surface of the carrier 23 facing towards the end face of the roller body 20.

The processor 17 handles a number of displays—normally one for each open application, and the display for the presently active application is actually displayed in the display 3. When the phone is in idle mode, it just monitors the network looking for an incoming call. The idle mode display, seen as the first display in FIG. 4, will include information identifying the network operator, here "Sonofon", and indicate that the depression of the roller body 20 of the navigation and selection key 10 will give access to the menu of the phone. The display may furthermore include some status indications informing the user about the battery level, the quality of the RF connection, local time, etc.

Figure 4:
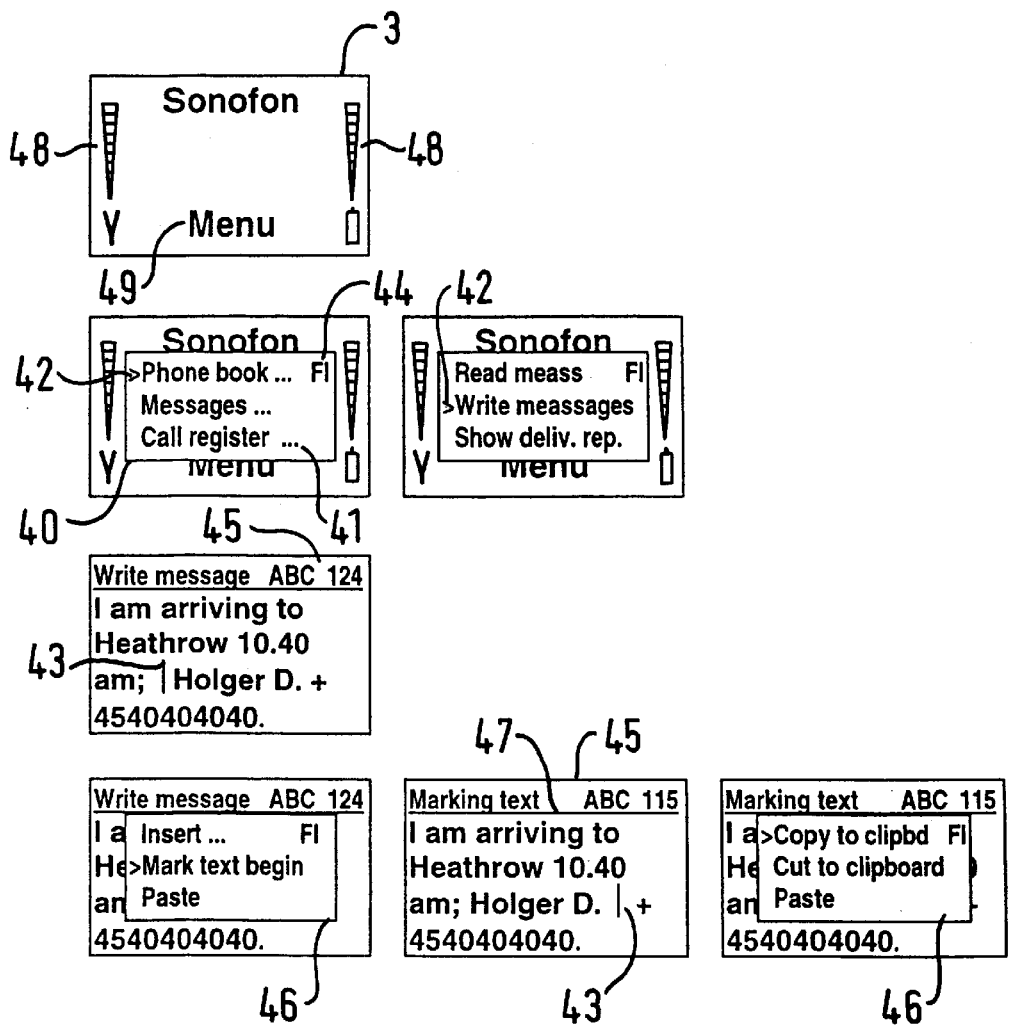
FIG. 4 schematically illustrates a preferred embodiment of a display with a pop-up window according to the invention.

As will be seen from the second display in FIG. 4, pressing the navigation and selection key 10 will cause a pop-up window 40 to appear on top of the previous display. The pop-up window 40 covers the underlying display partly, but in a way so that the user will still be able to recognize the background display. The number of text lines that may occur in the pop-up display 40 depends on the font used, of course. But if the full display includes five text lines, the pop-up display may advantageously include three text lines. The number of options or items available at a certain cursor position will in general exceed the number of lines, but then only a part of the list will be displayed.

The list of menu items shown in the pop-up window 40 in FIG. 4 normally includes up to ten items or even more. The list could be as follows:
1. Phone book—FI
2. Messages
3. Call register
4. Phone settings
5. Call divert services
6. Calendar
7. Tone settings—LI The functionality associated with the individual menu items is well known from commercial products, e.g. Nokia 3110™, from the applicant. As will be seen from FIG. 4, only the items 2–4 in the menu list are displayed in the pop-up window 40. It will be seen that one of the items in the list is marked by an icon acting as a cursor 42. Alternatively, the item could be marked by a bar with inverted colors. The cursor 42 is controlled by rolling the roller body 20 of the navigation and selection key 10, and the item pointed out by the cursor may be selected by pressing the roller body 20.

The items on the list are followed by an icon (here three dots) 41 when the selection of the item generates a new list of items to be displayed. This will basically be the situation for all items in the main menu list. It should be noted that the first and the last items in the list are marked by respective border icons 44 as FI (first item) and LI (last item). When the cursor 42 is moved outside the borders defined by these items (e.g. passing the first item in an upward direction), the pop-up window 40 will automatically disappear.

In the first display in the second row in FIG. 4 the user selects the "Message" menu item and this will cause a new menu list to pop up, and, as will be seen from the second display in the second row, this menu list will include standard message handling menus, such as:
1. Read messages
2. Write messages
3. Show delivery report
4. Message Center number
5. Reply via own center.
6. Delivery reports.
7. Voice mailbox number.

The idle mode display will still be present as a background display, and the phone will return to this idle mode display if no items are selected with a time-out of e.g. 5 seconds. If the user selects the "write message" item, the pop-up window will disappear and the background display will change from the "idle mode" display to the "text entry" display, as shown in the sole display in the third row of FIG. 4 with a status line 45 at the top of the display informing the user that the text entry is for a message sending application (write message), that the text entry application is in alpha mode (ABC), and that the cursor 43 is in position 124 (an SMS message contains max. 160 characters, and position 124 means that max. 124 characters follow).

The display 3 is provided as a dot matrix display for displaying signs arranged in a predetermined number of lines, each of which may contain a plurality of signs. The cursor 43 or the marker is provided as a gleaming bar that may be positioned between two of said signs. When the roller body 20 is depressed with the cursor 43 placed in the text, the processor starts displaying a context sensitive pop-up window including a number of selectable items or operations. The context sensitive pop-up window 46 covers a part of the active display, and it contains operations that are allowed in a position defined by the cursor 43 prior to the depression of the roller body 20.

When the context sensitive pop-up window 46 appears in a part of the display, the list of selectable items may include both SMS message related items and text editing related items. The list could include items such as:
1. Insert
2. Mark text begin
3. Paste
4. Send
5. Save
6. Exit
7. Erase If "Insert" is selected, the user will be requested in a new pop-up window to specify what he wants to insert and where to find it—e.g. an electronic business card (note pad), a name or a number (electronic phone book), etc.

If "Mark text begin" is selected by the user, as is the situation in the first display in the fourth row in FIG. 4, this cursor position will be handled as a first position. As will be seen in the second display in the fourth row in FIG. 4, the user is allowed to move the cursor 43 to a new position by rolling the roller body 20. It should be noted that the status line 45 indicates that the present status is marking text. When the cursor 43 has been moved to a new position by means of the navigation and selection key 10, a context sensitive pop-up window 46 will appear upon pressing the navigation and selection key 10, as will be seen in the third display in the fourth row of FIG. 4. The user may now select from the list in the pop-up window 40 which operation he wants to perform on the marked text. It does not matter whether the first cursor position is the first or the second one.

In response to the selection of the marked text the controller 17 generates a context sensitive pop-up window 46 (third display in the fourth row of FIG. 4) asking whether the user wants to cut or copy to the clipboard or replace (paste) the marked text with the content of the clipboard. If he copies the marked text to the clipboard, the paste operation allows the user to transfer the copied text to another application or to another file or record in the same application. The "Paste" option does not appear in the pop-up window when the clipboard memory is empty.

Upon selection of the "Send" option the processor 17 will generate a pop-up window (with the message beneath) asking for the receiving phone number, followed by a request for entering the message center number if that is not stored in the phone already.

When the user selects the "Save" option, the phone suggests saving the entered text and gives the record a name, such as 98.03.26–10:45 (point of time for saving "year.month.date-hour:minutes"). The "Exit" option will cause leaving the application without saving or sending the edited text, while the "Erase" option will erase the edited text but the user will remain in the application.

It should be noted that the pop-up window in the second row appears upon pressing the navigation and selection key 10 when it acts as a soft key. According to the preferred embodiment this will be the situation when the phone is in a mode without entry of a user input. There will be no cursor in the display during these modes without user input. This will typically be the situation when the user navigates in the menu structure, e.g. initiated in idle mode, until he needs to enter an input.

When the user is requested to enter an input, e.g. to write a message, as explained in relation to FIG. 4, the full active part of the display is available for the data entry. It will be seen from FIG. 4, third and fourth rows, how the antenna and battery indicator disappears. Also the soft key text disappears. In data entry mode, the navigation and selection key 10 will no longer have a special functionality or give access to the menu structure. When the navigation and selection key 10 is pressed in this mode, the context sensitive pop-up window 46 will appear, and the processor 17 will only allow operations which are allowable in the present application and with the present cursor position to be displayed in the context sensitive pop-up window 46.

Both the context sensitive pop-up window 46 and the ordinary menu item containing the pop-up window 40 may be escaped by moving the cursor 42 outside the borders of the window or by pressing the "clear" key 12. The phone will then go back to the application related to the underlying display partly visible behind the pop-up window.

A display for a phone according to the invention may e.g. be of the LCD type having a dot matrix display area of a size of 30×44 mm (height×width). The dots may preferably be rectangular, e.g. with a size of 0.42×0.34 mm (height× width–corresponding to a resolution of 57×70 dpi in a vertical and a horizontal direction, respectively) and being arranged with a 0.02 mm spacing. This will approximately provide 68×120 dots (height×width) or pixels in the active part.

As will be seen from FIG. 4, the phone uses a number of e.g. three standard fonts in the display, and the processor 17 changes the fonts dynamically (without actions from the user) in dependence on predetermined rules. Typically, each sign uses (height×width) 10×7 pixels in the biggest font and 7×5 pixels in the smallest font. The fonts used in the embodiment shown in FIG. 4 do not have a fixed width— letters like "l" require less width than the letter "m". The height is the same for all the signs in the font, and the width varies from two pixels (for "i") up to seven pixels (for "M" and "W") with an average width in the range of about five pixels. Generally, two neighbor signs are spaced by a single pixel and two lines are spaced by three pixels. In the idle mode display, columns with a width of ten pixels are used in each side of the display for the status bars 48, and a row with a height corresponding to thirteen pixels is used for the soft key text 49.

In text entry mode the full active display area will be available (here 68×120 pixels). The status line 45 has a width corresponding to 120 pixels, and with a font based on a width of approximately five pixels and a spacing of one pixel there between, approximately twenty characters will be allowed in the status line. The character height may be nine pixels. The status line 45 is separated from the text part by a line 47, whereby 51×120 pixels will be available for the text—and this will correspond to four lines with up to approximately twenty characters in each line.

Figure 5:
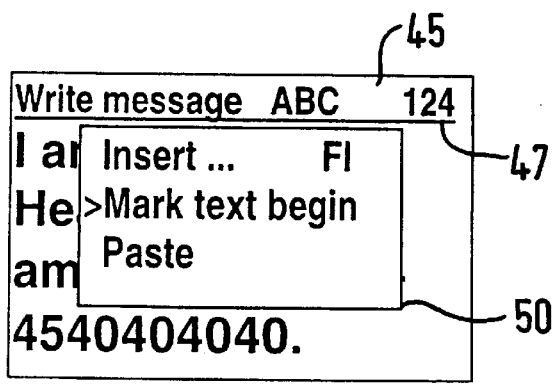
FIG. 5 schematically illustrates one of the displays shown in FIG. 4 on an enlarged scale.

The cursor 43 will be implemented as a gleaming bar (1×11 pixels) gleaming (pixels go on and off) approximately once per second. When the pop-up window 40 or 46 appears, it is surrounded by a rectangular borderline 50, as will be seen from FIG. 5. Outside this borderline 50 the underlying display is visible. The borderline 50 may have a width corresponding to two pixels. As will be seen from FIG. 5, a slightly smaller font is used, and this allows the pop-up window to contain three text lines with the status line 45 and the last line in the text part being fully visible. According to the preferred embodiment of the invention the pop-up window will use 40×84 pixels. With the present borderline width and a spacing of some pixels between the borderline and the text, the part of the pop-up window useable for displaying the functionality text may include 32×76 pixels. With a 7×5 font, three lines having 12–15 characters may be displayed. With the above-mentioned size of the display, the pop-up window will cover just above 40 percent of the full active display. It has been found that a pop-up window may advantageously cover from 30 percent to 60 percent, preferably between 35 and 50 percent, of the full active display when the display has a size corresponding to 50–100× 75–200 pixels. When the pop-up window becomes too small, the text will be difficult to read, and when the pop-up window covers a substantial part of the display, the user will no longer be able to recognize the background display.

Figure 6:
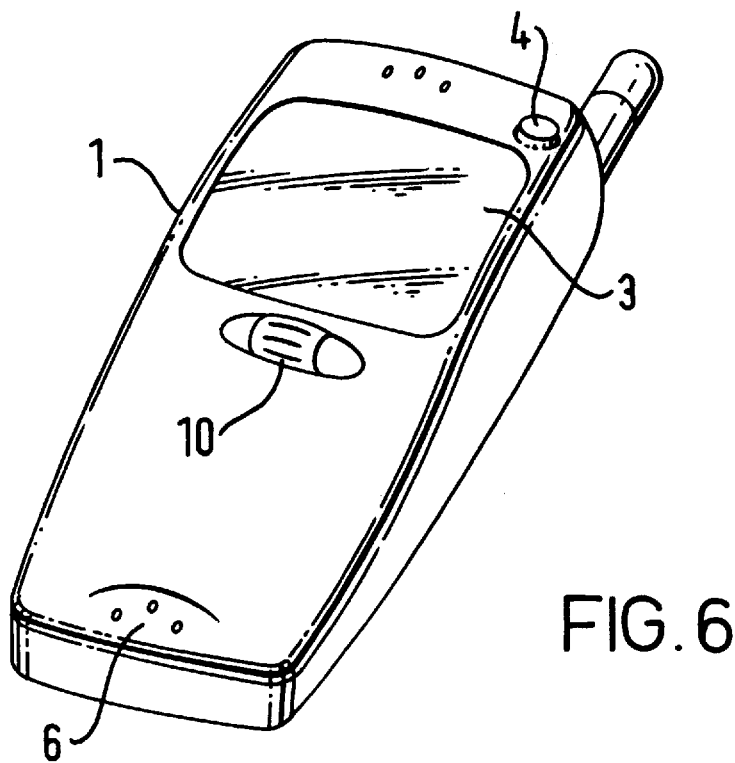
FIG. 6 schematically illustrates an alternative embodiment of a hand portable phone according to the invention.

FIG. 6 shows an alternative embodiment of a hand portable phone according to the invention, and this phone is remarkable in that the alphanumeric keys are left out, and that all functions are available via the navigation and selection key 10. The navigation and selection key 10 is actually the only input key of the phone. Today, all phones have between 15 and 20 keys or even a higher number of keys.

Figure 7:
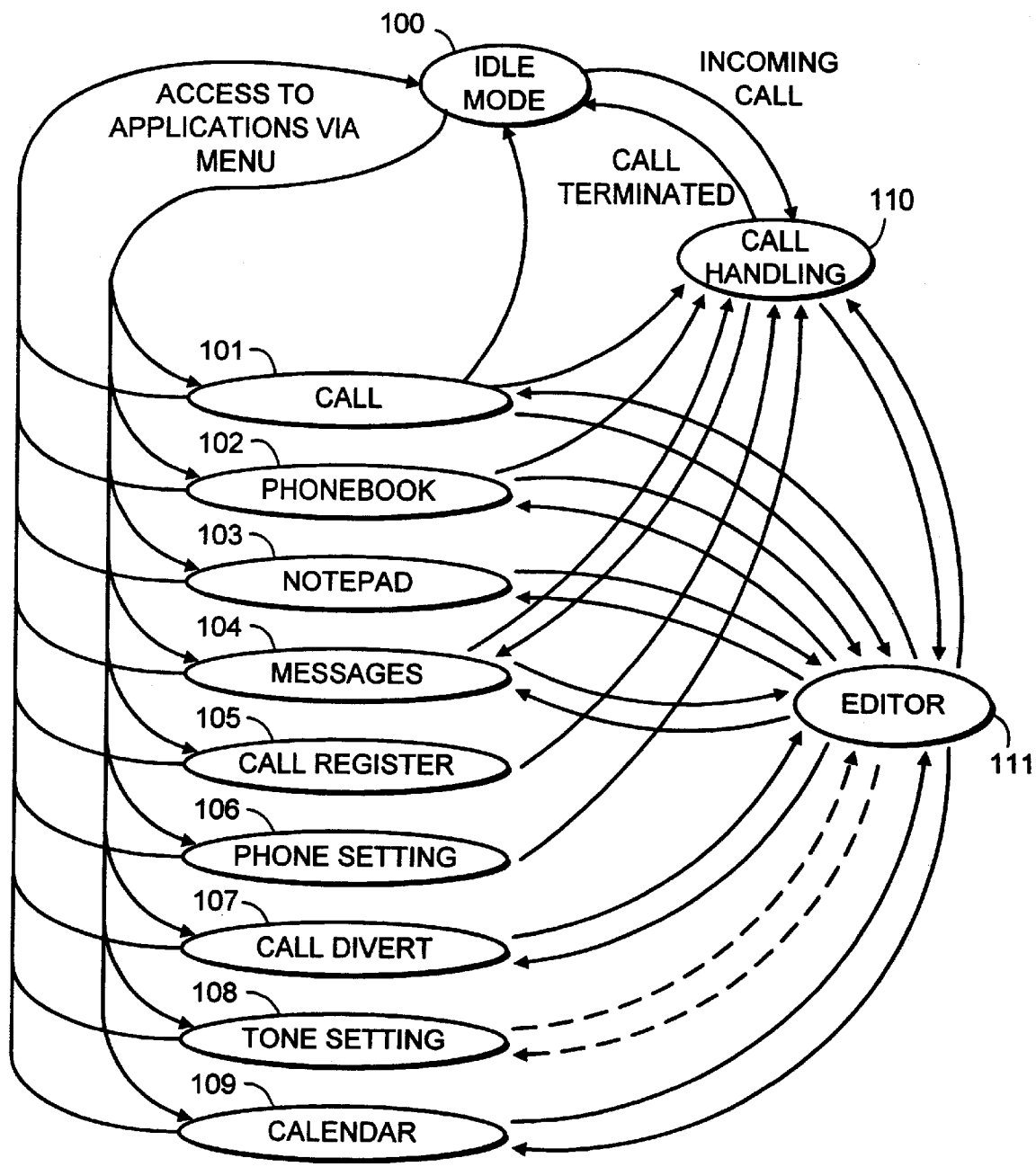
FIG. 7 shows a state diagram for the hand portable phone according to the invention.

From idle mode, pressing the navigation and selection key 10 gives access to the menu of the phone. Here the menu list used in the embodiment explained with reference to FIG. 1 needs some further items. The list could be as follows:
1. Call—FI
2. Phone book
3. Editor
4. Messages
5. Call register
6. Phone settings
7. Call divert services
8. Tone settings—LI As will be seen from the list, only two new menu items are necessary, and these are "Call" and "Editor". FIG. 7 illustrates how the applications interact in the phone shown in FIG. 6.

Advantageously, the phone is capable of assuming a plurality of states in which a group of predetermined functions or actions associated with the state concerned may be performed or accessed by means of the navigation and selection key 10. The processor 17 displays one of said group of functions as a default function. The default operation or function is executed upon pressing the navigation and selection key 10, and the full set of operations is available upon rolling the navigation and selection key 10.

FIG. 7 illustrates how the one key phone according to an alternative embodiment of the invention may change state from idle mode 100 in two ways. If an in-coming call is detected, the phone changes to a call handling state 110 in which the user is allowed to answer the call by pressing the navigation and selection key 10. By rolling the navigation and selection key 10 the pop-up window with the full set of allowable actions will appear, whereby the user is allowed to reject the incoming call or to manually divert the call.

Otherwise, the user has to access the menu by pressing and rolling the navigation and selection key 10, whereby he may select an item in a pop-up window (like in FIG. 4). Then the above-mentioned eight menu items are available. The phone is provided with a special editor allowing the user to input all kinds of data into e.g. a phone, and this editor is basically described in a British patent application serial no. 9800746.1 filed by the applicant on Jan. 14, 1998. This application is hereby incorporated by reference into the present application.

This editor is very useful in relation to a one key phone, and the operation of the phone will be explained with reference to FIGS. 7 and 8. When the user selects "Menu" in idle mode (see the display in the first row in FIG. 8) by pressing the navigation and selection key 10, the processor 17 displays a pop-up window 120 including the items available in the menu structure. According to this embodiment these items will be:
1. Call
2. Phone book
3. Notepad
4. Messages
5. Call register
6. Phone settings
7. Call divert services
8. Tone settings
9. Calendar When the user moves a cursor 121 to the "Notepad" option and selects this option by rolling and pressing the navigation and selection key 10, as will be seen from the first display in the second row of FIG. 8, the processor 17 displays a new pop-up window 122 (second display in the second row of FIG. 8) asking the user to specify the kind of entry he wants to make. The phone is in state 103 in FIG. 7.

He may enter a phone number for making a standard call, a phone number and a corresponding name for storing a record in the phone book, an alphanumeric string ("Text") for a calendar, a message to be sent, etc. If the user selects the "Phone number" item in the second display in the second row of FIG. 8, the processor 17 changes the idle mode background display to an editor display shown as the first display in the third row of FIG. 8, and goes to the editing state 111 in FIG. 7.

A status line 123 indicates the kind of the present input activity, an auxiliary window 126 indicates a string of input candidates, and a candidate may be pointed out by a cursor 127. The movement of the cursor 127 is controlled by rolling the navigation and selection key 10, and the item is selected by pressing the navigation and selection key 10. When a candidate is selected, it is transferred to a character string 124 in the main part of the display in a position pointed out by a cursor 125. The auxiliary window 126 includes the numbers 0–9, a "+" sign and an "OK" icon indicating that the editing is to be terminated. If the user moves the cursor 126 outside this string (as is the case with the context sensitive pop-up window), the auxiliary window 126 will disappear and the navigation and selection key 10 will control the cursor 125 in the string 124. By pressing the navigation and selection key 10 the user may recall the auxiliary window 126 by selecting an "Insert" option in a context sensitive pop-up window including items such as: "Clear", "Insert", "Quit", "Call" and "Save".

Figure 8:
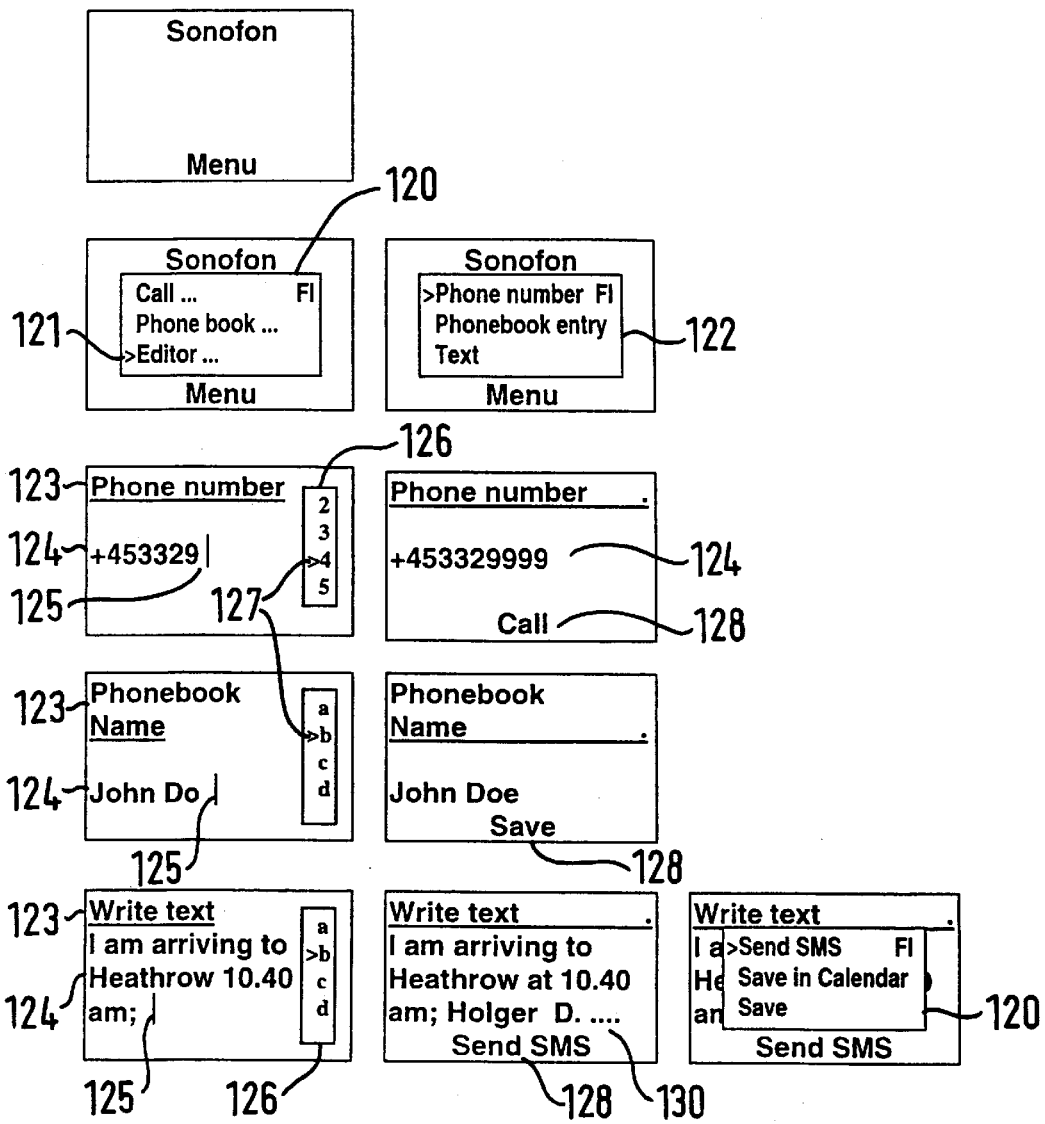
FIG. 8 shows an example of the editor used in the hand portable phone according to the invention.

If the user selects the "OK" icon in the auxiliary window 126, said window 126 and the cursor 125 will disappear with the entered character string 124 present in the display, as will be seen from the second display in the third row of FIG. 8. The navigation and selection key 10 will get the "Call" function 128 as default option when pressed. If the navigation and selection key 10 is rolled, alternative options will appear in a new pop-up window. This pop-up window includes items such as: "Call", "Edit", "SMS", "Quit", and "Save".

With the selection of the "Edit" option the entered string will be re-opened for continued editing, the selection of the "SMS" option will request the user to enter a message text, and the selection of the "Quit" option will cause the phone to leave the editing mode and go back to idle mode without saving anything. The "call" option will initiate a call based on the phone number present in the display. The selection of the "Save" option will request the user to enter a name to be used as a label in the phone book. This is shown in the first display in the fourth row of FIG. 8. In the status line 123 it is indicated that the editor presently handles a name entry to the phone book. A part of a text string 124 has been entered.

It should be noted that the auxiliary window 126 contains the letters a–z (in the English language version), and an icon for switching between upper and lower cases, an icon giving access to a candidate string comprising the Figures 0–9, and an icon giving access to a candidate string comprising the special characters such as the Greek letters and other signs presently used in phones. In general, the editor uses title case when used in combination with the phone book application and text case when used for entering text for a message or a calendar entry. The standard letter string displayed in the auxiliary window 126 acts as a basic character string. Selecting the "OK" icon in the figures string or the special characters string recalls the basic character string, whereas selecting the "OK" icon in the basic character string will cause the editing to terminate.

In the second display in the fourth row in FIG. 8 the "OK" icon in the basic character string has been selected and the editing is terminated. Pressing the navigation and selection key 10 will save the entered name and number in a record in the phone book.

If, instead of selecting the "Save" option, the user had selected the "SMS" option in the pop-up window which appeared when the navigation and selection key 10 was rolled in the second display in the third row of FIG. 8, he would have been requested to write a message text. The "Write text" display is shown in the first display in the fifth row in FIG. 8. The status line 123 indicates the kind of text presently edited, and a cursor 125 is placed in the entered text string 124, indicating the position of the next character selected from the auxiliary window 126. When the "OK" icon is selected in the auxiliary window 126, the entered string becomes truncated, as is indicated by four dots 130, thereby creating space for a soft key text for the navigation and selection key 10. The default function will send an SMS message, but when rolling the navigation and selection key 10 the alternative options will appear. When the "send SMS" is selected, the phone number entered earlier will be used as the receiving number, and the user will be requested to enter his message center number if this number is not stored in the phone yet.

The basic idea of the one key phone is that the phone has a large number of applications, each of which uses the editor for entering new data. When the "Call" application 101 in FIG. 7 is selected in the menu, the "Call" application 101 uses the editor application 111 for entering the phone number and the call handling application for actually setting up a connection based on the entered phone number.

When the "Phone book" application 102 is selected, the editor application 111 is likewise used for entering a phone number and a name as a new record in the phone book. The editor application 111 is also used when an existing record has to be amended, and the operation will be the same as re-opening the string for continued editing, as explained with reference to FIG. 8. As will be seen from FIG. 7, a call may be initiated from a phone book record. This is already possible in Nokia 3110™.

The "Notepad" application 103 gives direct access to the editor application 111, and the entered data may be stored in other applications afterwards. However, records may be stored in the "Notepad" application when it is used as a kind of notebook.

Also the "Message" application 104 uses the editor application 111 for entering text and phone numbers. The "Message" application 104 also uses the call handling application 110 for transmitting and receiving messages.

The "Call register" application 105 just lists the latest ingoing, outgoing and missed calls. The application does not use editing, but outgoing calls may be initiated from this application. The "Phone setting" application 106 just sets some parameters for the phone, and no editing is required.

The "Call divert" application 107 uses the editor application 111 for entering phone numbers and the call handling application 110 for transferring the divert instructions to the network.

The "Tone setting" application 108 normally does not use the editor application 111, but if the editor application is prepared for handling the input of new ringing tunes, as described in the above-mentioned British patent application serial no. 9800746.1, the "Tone setting" application 108 may benefit from inputs from the editor application, too.

The "Calendar application" 109 depends on input from the editor application 111, too. However, inputs may come from e.g. the "Notepad" application 103 or the "Message application 104—but via the editor application.

A context sensitive pop-up window allows soft keys to be left out. This increases the part of the display available for text editing, etc. However, all the options will be available in the window popping up when the navigation and selection key 10 is pressed. The alphanumeric keys normally used may be left out by using a new editor based on input candidates. The size of the phone may be reduced hereby.

The functionality of the navigation means for moving a marker in the display and the selection means for selecting items marked by the marker, e.g. integrated in a depressable roller based navigation key 10, as described above, varies in dependence on the mode of the phone. Table 1 gives an overview of the most basic modes of the phone according to the invention.

TABLE 1

| | Rolling the navigation key 10 | Pressing the navigation key 10 |
|---|---|---|
| Idle Mode | The phone will display one of two lists in dependence on the rolling direction, e.g. the phone book and the last-dialed stack. | The navigation key 10 has a functionality corresponding to a soft key known per se. The selection of "Menu" will cause a pop-up window including the sub-items of the Menu to appear. |
| Listing Mode | The cursor will scroll/browse through the items in the list. | The item highlighted by the cursor will be selected. If the selection of the item allows the user to select among sub-items, a pop-up window including these sub-items will appear in the window. |
| Call handling Mode | A list containing allowable operations will be accessed. | The default soft key operation will be selected, e.g. terminating an ongoing call. |
| Editing or Entry Mode | The cursor will be moved through the entered string of letters and numbers. | The context sensitive pop-up window will appear in dependence on the cursor position. |

According to the two described embodiments of the invention the navigation key 10 will have a functionality known per se in "Idle Mode". By rolling the navigation key 10 the phone will display one of two lists in dependence on the rolling direction, e.g. the phone book and the last-dialed stack. This corresponds to pressing the Navy-key™ on the phone Nokia 3110™ in idle mode. The navigation key 10 has a functionality corresponding to a soft key on the phone Nokia 3110™. The "Menu" will be selected by pressing the navigation key 10. However, as a novel feature a pop-up window including the sub-items of the Menu will appear.

When the pop-up window occurs—either by selecting a soft key option or the context sensitive one—the phone will be in a "Listing Mode". Rolling the navigation key 10 will cause the cursor to scroll/browse through the items in the list, and pressing the navigation key 10 will cause selection of the item highlighted by the cursor. If the selection of the item allows the user to select among further sub-items, a pop-up window including these sub-items will appear in the window. Otherwise, an operation, e.g. establishing a call, will be performed.

When a call has been set up, the phone will be in a "Call handling Mode" in which the navigation key 10 will have a default soft key functionality (call termination) when depressed. Rolling the navigation key 10 will access a list containing allowable operations in the mode in question.

During editing—either by use of an editor based on an alphanumeric key set or by use of the editor described as the alternative embodiment, the phone will be in an "Editing or Entry Mode". The navigation and selection key 10 will not act as a soft key, whereby the part of the display normally reserved for the display of the soft key operation will be available for the entry. The cursor will be moved through the entered string of letters and numbers or the entry candidate string upon rolling the navigation and selection key 10. The context sensitive pop-up window will appear in dependence on the cursor position upon pressing the navigation and selection key 10. As long as the context sensitive pop-up window is present in the display, the phone will be in the "Listing Mode".

What is claimed is:

1. A portable phone having: a display adapted to display data, and input means for inputting both information and instructions to a control unit in the phone, the control unit controlling the display in dependence on the operation of the input means; the input means including:

a moving means in the form of a navigation key for moving a marker in the display; and a request means in the form of a selection key for providing a request to the control unit for displaying operations which are allowed in a position defined by the marker; the control unit generating a pop-up window which covers a part of the display upon reception of the request, and which includes the allowed operations in dependence of the position of the marker; and the navigation key and the selection key allowing a user to navigate between the allowed operations present in the pop-up window, and to select one of these allowed operations, the pop-up window being initiated by the user pressing the selection key.

2. A portable phone according to claim 1, wherein a navigation and selection key assembly is positioned centrally on a front surface of said phone, and includes said selection key and said navigation key.

3. A portable phone according to claim 2, wherein said navigation and selection key assembly includes: a depressible roller body; a support structure of the roller body; an encoder operatively connected to said control unit for detecting the rolling of the roller body; and a sensor operatively connected to said control unit for detecting the depression of the roller body; said control unit generating said pop-up window which includes a set of allowed operations, and which covers a part of said display upon reception of a request provided by depressing the roller body.

4. A portable phone according to claim 3, wherein said navigation and selection key assembly is the only input means of said phone.

5. A portable phone according to claim 3, further comprising an editor controlled by said control unit and operated by said navigation key, said control unit defining for the editor: a first display part in said display for displaying a string of entered information; and a second display part in the display for displaying a string of a plurality of possible information candidates; one of the candidates in the candidate string being highlighted by said marker whose movement through information candidates is controlled by the rolling of the roller body, and the highlighted candidate being selectable for entering into the string of entered information by pressing said roller body.

6. A portable phone according to claim 1, wherein said means for moving said marker in said display comprises navigation key means including a roller body whose rolling is detected by means of an encoder operatively connected to said control unit which controls movement of said marker in said display in dependence thereon.

7. A portable phone according to claim 6, wherein said request means comprises a sensor integrated in a support structure for said roller body, said moving and request means being integrated in said navigation key means.

8. A portable phone according to claim 7, further comprising an editor controlled by said control unit and operated by said navigation key means, said control unit defining for the editor: a first display part in the display for displaying a string of entered information; and a second display part in the display for displaying a string of a plurality of possible information candidates; one of the candidates in the candidate string being highlighted by said marker whose movement through information candidates is controlled by the rolling of said navigation key means, and highlighted candidate being selectable for entering into the string of entered information by pressing said navigation key means.

9. A portable phone according to claim 8, wherein all inputs into said phone may be performed by rolling and pressing a navigation and selection key assembly.

10. A portable phone according to claim 9, wherein said navigation and selection key assembly is the only input means of said phone.

11. A portable phone according to claim 1, wherein the content of said pop-up window in an entry or editing mode exhibits marker determined context sensitivity.

12. A phone according to claim 11, wherein said display is a dot matrix display for displaying signs arranged in a predetermined number of lines in the active part of said display, each of the lines may contain a plurality of signs, and said marker is provided as a gleaming bar which may be positioned between two of the signs.

13. A portable phone according to claim 11, wherein said phone changes state upon the occurrence of the context sensitive pop-up window to a listing mode in which a plurality of allowable operations are listed in said pop-up window, and wherein said request providing input means changes functionality to a selection means which, when depressed, selects the operation marked by said marker.

14. A portable phone according to claim 1, wherein said pop-up window is demarcated from the active display areas by means of borderlines defining a rectangular frame.

15. A portable phone according to claim 14, wherein said pop-up window within said rectangular frame displays a number of selectable operations in a listing mode.

16. A portable phone according to claim 15 wherein said pop-up window within said rectangular frame displays from 2 to 4 selectable operations.

17. A portable phone according to claim 15, wherein said control unit handles a list including a plurality of selectable operations arranged in a predetermined order with only a fractional set of a full set of operations shown simultaneously in said pop-up window; and rolling of said navigation key means causes scanning through the full set of operation.

18. A portable phone according to claim 17, wherein said pop-up window displays three operations with said display updated for every step in said list, whereby said marker will highlight the operation in the middle of said pop-up window.

19. A portable phone according to claim 15, wherein a full set of operations is arranged with two operations defined as a first item and a last item in a list, respectively; and in a listing mode, wen said marker passes outside the first or the last item in the list, said pop-up window disappears and said phone goes from listing mode to a mode associated with a background display.

20. A portable phone according to claim 1, wherein said pop-up window area covers from about 30 percent to about 70 percent of the full active display area.

21. A portable phone having: a display adapted to display data, and input means for inputting both information and instructions to a control unit in the phone, the control unit controlling the display in dependence on the operation of the input means; the input means including:

a navigation key for moving a marker in the display; and a selection key for providing a request to the control unit for displaying operations which are allowed in a position defined by the marker, the allowed operations being shown in close relation to the displayed data in a pop-up window upon request by a user;

the control unit generating the pop-up window which includes the allowed operations and covers from about 30 percent to about 70 percent of the full active display area; and the navigation key and the selection key allowing the user to navigate between the allowed operations present in the pop-up window and to select one of the allowed operations, the pop-up window being initiated by the user pressing the selection key.

22. A portable phone having:

transceiver means for wireless communication via a telecommunication network for call handling;

a display adapted to display data;

input means for inputting both information and instructions to a control unit in the phone, the control unit controlling the display in dependence on the operation of the input means, the input means including a navigation key for moving a marker in the display and a selection key for providing a request to the control unit for displaying operations which are allowed in a position defined by the marker; the control unit generating a pop-up window which covers a part of the display upon reception of the request and which includes the allowed operations; and a navigation and selection key assembly positioned centrally on a front surface of the phone and including the selection key and the navigation key for allowing a user to navigate between the allowed operations present in the display as well as in the pop-up window and to select one of these operations, the pop-up window being initiated by the user pressing the selection key.

* * * * *